US012706516B2

(12) United States Patent
Ahmed et al.

(10) Patent No.: US 12,706,516 B2
(45) Date of Patent: Aug. 11, 2026

(54) COMPENSATION CIRCUIT FOR TRANSIENT RESPONSE IMPROVEMENT

(71) Applicant: TEXAS INSTRUMENTS INCORPORATED, Dallas, TX (US)

(72) Inventors: Mohamed Ahmed, Merrimack, NH (US); Matthew Schurmann, Wylie, TX (US); Rengang Chen, Center Valley, PA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 302 days.

(21) Appl. No.: 18/326,584

(22) Filed: May 31, 2023

(65) Prior Publication Data

US 2024/0405659 A1 Dec. 5, 2024

(51) Int. Cl.

| | |
|---|---|
| ***H02M 1/00*** | (2007.01) |
| ***H02M 3/156*** | (2006.01) |
| ***H02M 3/158*** | (2006.01) |
| ***H02M 3/335*** | (2006.01) |

(52) U.S. Cl.

CPC ....... *H02M 1/0009* (2021.05); *H02M 1/0025* (2021.05); *H02M 1/0064* (2021.05); *H02M 3/1566* (2021.05); *H02M 3/1586* (2021.05); *H02M 3/3353* (2013.01)

(58) Field of Classification Search

CPC ............. H02M 1/0003; H02M 1/0009; H02M 1/0012; H02M 1/0025; H02M 1/0048; H02M 1/0064; H02M 1/32; H02M 1/36; H02M 3/156; H02M 3/1566; H02M 3/157; H02M 3/158; H02M 3/1584; H02M 3/1586; H02M 3/335; H02M 3/33507; H02M 3/3353; H02M 3/33569

See application file for complete search history.

(56) References Cited

U.S. PATENT DOCUMENTS

| | | | | |
|---|---|---|---|---|
| 11,303,204 | B1 * | 4/2022 | Zhao | H02M 3/1588 |
| 2016/0011614 | A1 * | 1/2016 | Jiang | H02M 3/158 323/233 |
| 2022/0109368 | A1 * | 4/2022 | Zhou | H02M 3/1586 |
| 2022/0216793 | A1 * | 7/2022 | Shao | H02M 3/1566 |
| 2022/0247316 | A1 * | 8/2022 | Jiang | H02M 3/1584 |
| 2023/0049859 | A1 * | 2/2023 | Capetillo | H02M 1/0009 |
| 2023/0057705 | A1 * | 2/2023 | You | H02M 3/33571 |
| 2023/0299687 | A1 * | 9/2023 | Shao | H02M 3/158 |
| 2023/0318430 | A1 * | 10/2023 | Chen | H02M 3/1586 323/271 |
| 2024/0333160 | A1 * | 10/2024 | Shen | H02M 1/32 |
| 2024/0405678 | A1 * | 12/2024 | Nishimoto | H02M 3/158 |

* cited by examiner

*Primary Examiner* — Thienvu V Tran
*Assistant Examiner* — Shahzeb K Ahmad
(74) *Attorney, Agent, or Firm* — Charles F. Koch

(57) ABSTRACT

A circuit includes a compensation inductor, a compensation resistor, and a current emulation circuit. The current emulation circuit has a time constant smaller than a time constant of the compensation inductor and the compensation resistor. The current emulation circuit includes a sense resistor having a first terminal coupled with a first terminal of the compensation inductor, and a sense capacitor having a first terminal coupled with a second terminal of the sense resistor and a second terminal coupled with ground.

26 Claims, 18 Drawing Sheets

200

LOAD STEP-UP
350
300
250
200
150
100
50
0
-50
201
Isw_sens vs. Isw_act/mV
210
220
202
TIME/μSecs
ACTUAL PHASE CURRENT $i_{ph}$
REPORTED PS CURRENT $i_{CSP}$

330

LOAD STEP-DOWN
ACTUAL $i_{sum\text{-}actual}$
REPORTED $i_{sum}$
350
340
331
332
1.0
0.8
0.6
0.4
0.2
0.0
Isum_sens vs. Isum_act/V
TIME/μSecs

1300

Rsense
RFB1
Cc
1304
1308
1312
1302
VIN
1306
Csense
RFB2
1310
VOUT
1315

1400

1420
0
-20
-40
-60
-80
dB
Cc=220n
Cc=1μ
1422
1424
1410
FREQ/Hertz

COMPENSATION CIRCUIT FOR TRANSIENT RESPONSE IMPROVEMENT

TECHNICAL BACKGROUND

With the emerging applications of cloud computing and artificial intelligence, the need for power-hungry microprocessors is increasing. These microprocessors have stringent transient voltage requirements with high current slew rates (many larger than 3000 A/μs). Multi-phase buck converter designs with a plurality of phases are utilized to meet these power requirements. However, due to dense circuit board designs, the addition of more capacitors to reduce transients is not generally possible.

Trans-Inductor Voltage regulator (TLVR) buck converter topology has been used to lower the output capacitance while satisfying higher transient requirements. Due to the nature of these circuits, the inductor current slew rates during transient loading is much higher compared to ordinary buck converter voltage regulators.

The measured currents from the power stages are added inside the controller to create a total current signal. However, due to the very fast transient times of the TLVR buck converters, the individual current sensors are unable to respond as quickly as needed, and the total current signal fails to accurately represent the actual current of the TLVR buck converter.

When the total current signal is used inside the controller compensation loop to achieve an optimal and fast transient response, this difference between the reported currents and the actual currents degrades performance of the control loop and ringing occurs on the output voltage of the buck converter during transient load conditions. This ringing causes the power supplied to the microprocessors to fail their transient voltage requirements.

SUMMARY

In an implementation, a circuit includes a compensation inductor, a compensation resistor, and a current emulation circuit. The current emulation circuit has a time constant smaller than a time constant of the compensation inductor and the compensation resistor. The current emulation circuit includes a sense resistor having a first terminal coupled with a first terminal of the compensation inductor, and a sense capacitor having a first terminal coupled with a second terminal of the sense resistor and a second terminal coupled with ground.

In another implementation, a circuit includes a buck converter, a compensation inductor, a compensation resistor, and a current emulation circuit. The buck converter includes a Trans-Inductor Voltage regulator (TVLR) transformer having a plurality of secondary coils coupled in series between a ground and a compensation terminal.

The compensation inductor and compensation resistor are coupled in series between the compensation terminal and the ground, and have a compensation time constant. The current emulation circuit has a time constant smaller than the compensation time constant. The current emulation circuit includes a sense resistor having a first terminal coupled with the compensation terminal, and a sense capacitor having a first terminal coupled with a second terminal of the sense resistor and a second terminal coupled with ground.

In a further embodiment, a system includes a buck converter, a controller, a compensation inductor, a compensation resistor, and a current emulation circuit. The buck converter includes a Trans-Inductor Voltage regulator (TVLR) transformer having a plurality of secondary coils coupled in series between a ground and a compensation terminal.

The controller is configured to provide pulse width modulated control signals to the buck converter. The compensation inductor and compensation resistor are coupled in series between the compensation terminal and the ground, and have a compensation time constant.

The current emulation circuit has a time constant smaller than the compensation time constant. The current emulation circuit includes a sense resistor having a first terminal coupled with the compensation terminal, and a sense capacitor having a first terminal coupled with a second terminal of the sense resistor and a second terminal coupled with ground.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following descriptions of various example embodiments and implementations of a compensation circuit for transient response improvement of buck converters. As discussed above, current sensing and feedback to the controller is critical during transient loading conditions. Due to the nature of TLVR buck converters, inductor slew rates during transient loading are much higher than in normal buck converters. With these fast slew rates existing power stage technology is not capable of reporting accurate current sense signals to the controller curing load transients. Errors in reported current cause the controller to fail to accurately respond to changes in load on the power converter and results in ringing on the output voltage of the power converter.

By adding a RC circuit to the RLVR compensation inductor, the current is sensed with a smaller time constant and this faster feedback is then provided to the controller to compensate for the errors created by the insufficient response time of the sensor.

Figure 1:
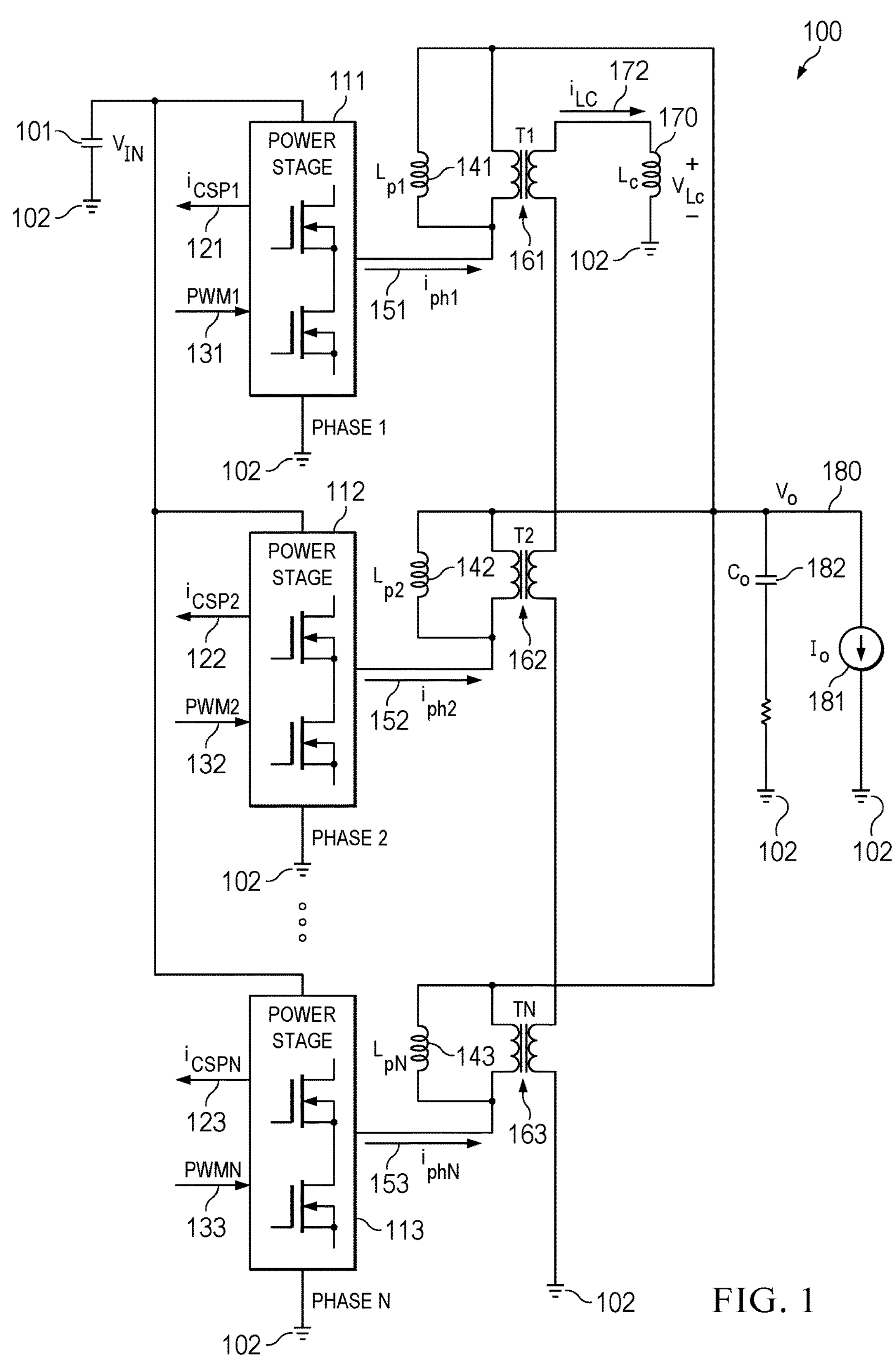
FIG. 1 illustrates an example buck converter including a Trans-Inductor Voltage regulator (TVLR) transformer.

FIG. 1 illustrates an example buck converter including a Trans-Inductor Voltage regulator (TVLR) transformer. In this example embodiment, an N-phase buck converter is illustrated including phase 1 power stage 111, phase 2 power stage 112, through phase N power stage 113. Each power stage is driven by a pulse width modulated (PWM) control signal provided by a controller. Control signals PWM1 131, PWM2 132, through PWMN 133 are illustrated here. Each power stage returns a current sense signal to the controller. Current sense signals $i_{CSP1}$ 121, $i_{CSP2}$ 122, through $i_{CSPx}$ 123 are illustrated here.

The buck converter is powered by $V_{in}$ 101 and is also coupled with ground 102. The output of each phase of the multi-phase buck converter is provided to the Trans-Inductor Voltage regulator (TVLR) transformer, here comprising T1 161, T2 162, through TN 163. The TVLR transformer also includes inductors for each phase of the buck converter, here comprising Lp1 141, Lp2 142, through Lp3 143. The current from each phase of the buck converter is $i_{ph1}$ 151, $i_{ph2}$ 152, through $i_{phN}$ 153. The output of the buck converter $V_o$ 180 is illustrated as applied to a capacitive load $C_o$ 182 and has a current of $I_o$ 181.

In this example, the secondary coils of the Trans-Inductor Voltage regulator (TVLR) transformer are coupled in series and coupled to a compensation inductor $L_c$ 170 at terminal 172. Compensation inductor $L_c$ 170 includes a compensation resistor either as a resistance within the inductor or as a discrete component. Current through the compensation inductor is labeled $i_{Lc}$ and the voltage at terminal 172 is labeled $V_{Lc}$. This voltage at terminal 172 is referred to as a compensation signal. This compensation signal reflects the sum of the current of each phase of the buck converter and is provided to the controller (after modification by the RC circuit described below) to the controller in order to accurately respond to transient changes in load on the buck converter.

Figure 2A:
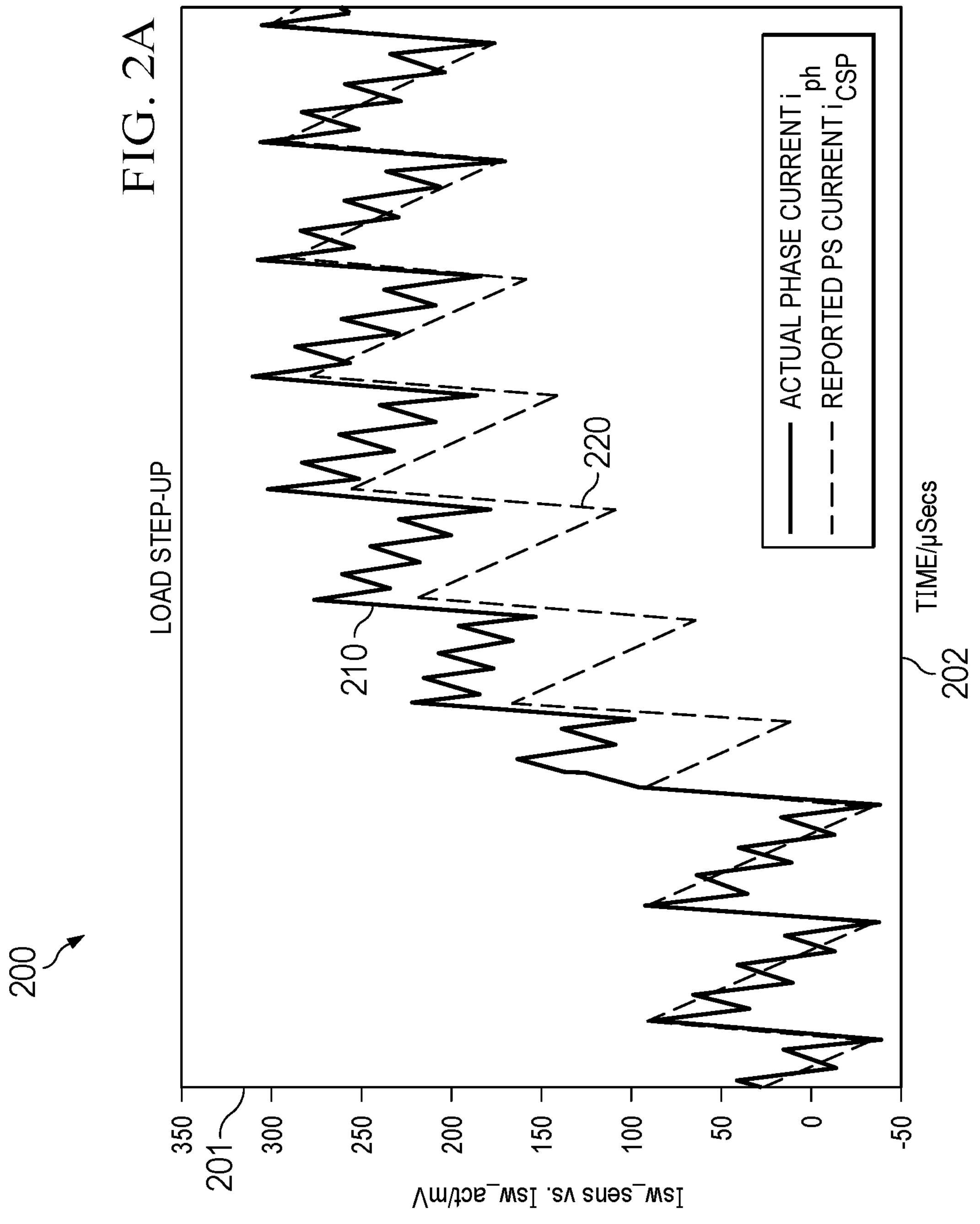
FIGS. 2A and 2B illustrate actual phase current and reported phase current for the example buck converter of FIG. 1 during load step-up and load step-down.
Figure 2B:
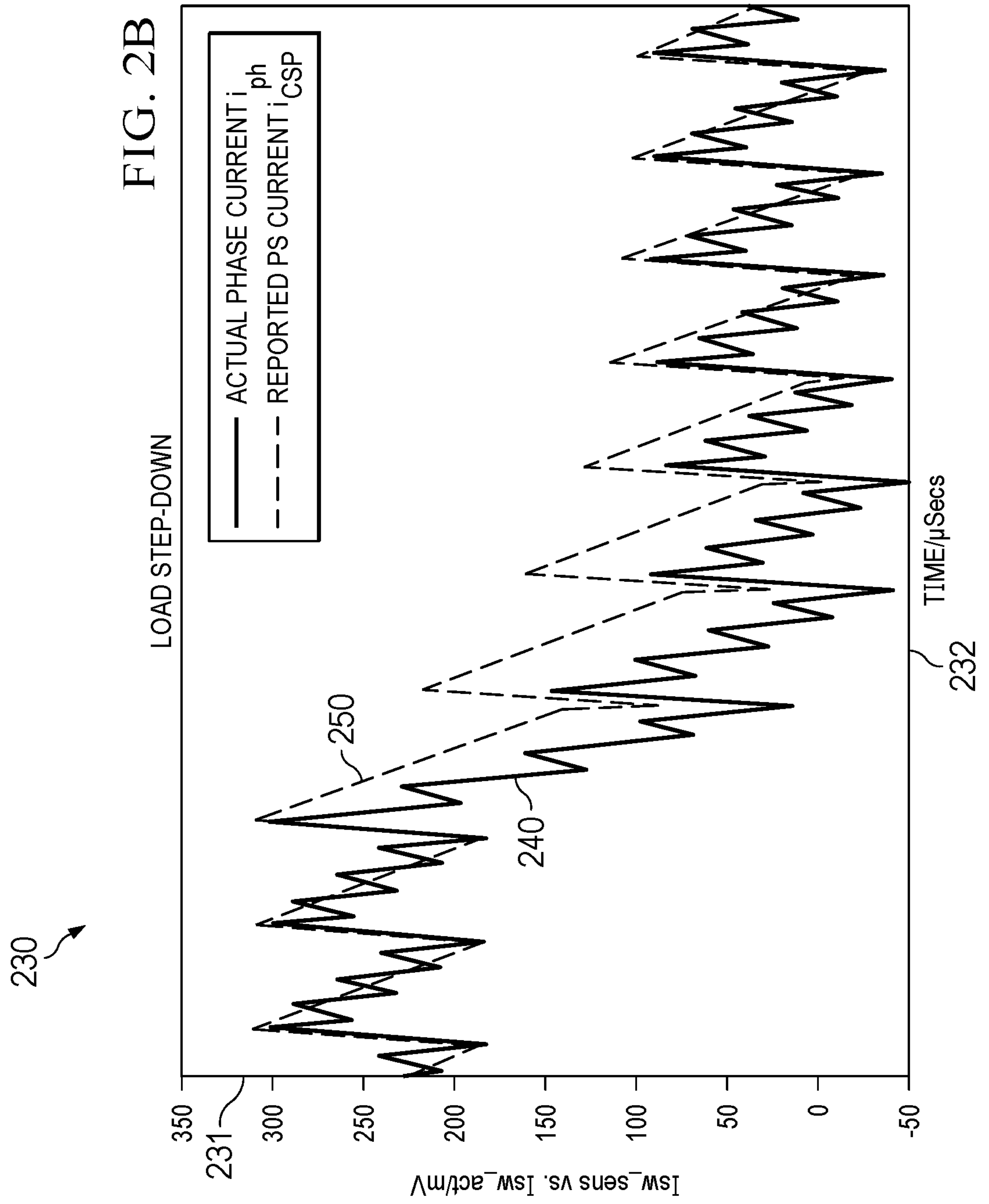

FIGS. 2A and 2B illustrate actual phase current and reported phase current for the buck converter of FIG. 1 during load step-up 200 and load step-down 230 respectively. FIGS. 2A and 2B are simulation results illustrating the difference between actual current and reported current from a single phase of the buck converter of FIG. 1. The vertical axis is current reported as a signal in mV 201 and 231 while the horizontal axis is time in uS 202 and 232.

FIG. 2A shows the difference between actual phase current $i_{ph}$ 210 and reported phase current $i_{CSP}$ 220 for a single stage of the buck converter of FIG. 1 during a load step-up.

FIG. 2B shows the difference between actual phase current $i_{ph}$ 240 and reported phase current $i_{CSP}$ 250 for a single stage of the buck converter of FIG. 1 during a load step-down.

In both cases the reported phase current lags the actual phase current resulting in errors in the control loop within the controller.

Figure 3A:
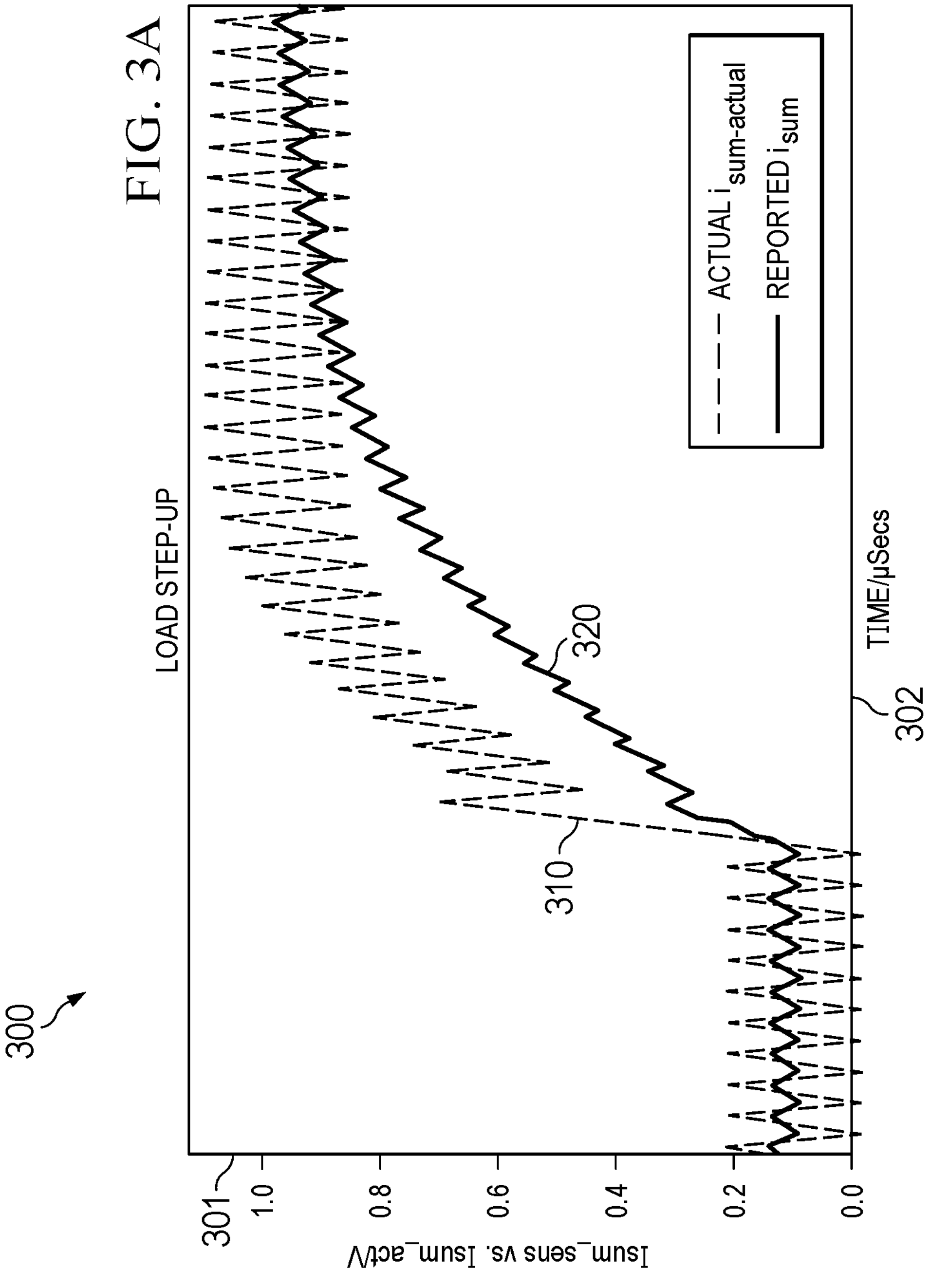
FIGS. 3A and 3B illustrate actual total current and reported total current for the example buck converter of FIG. 1 during load step-up and load step-down.
Figure 3B:
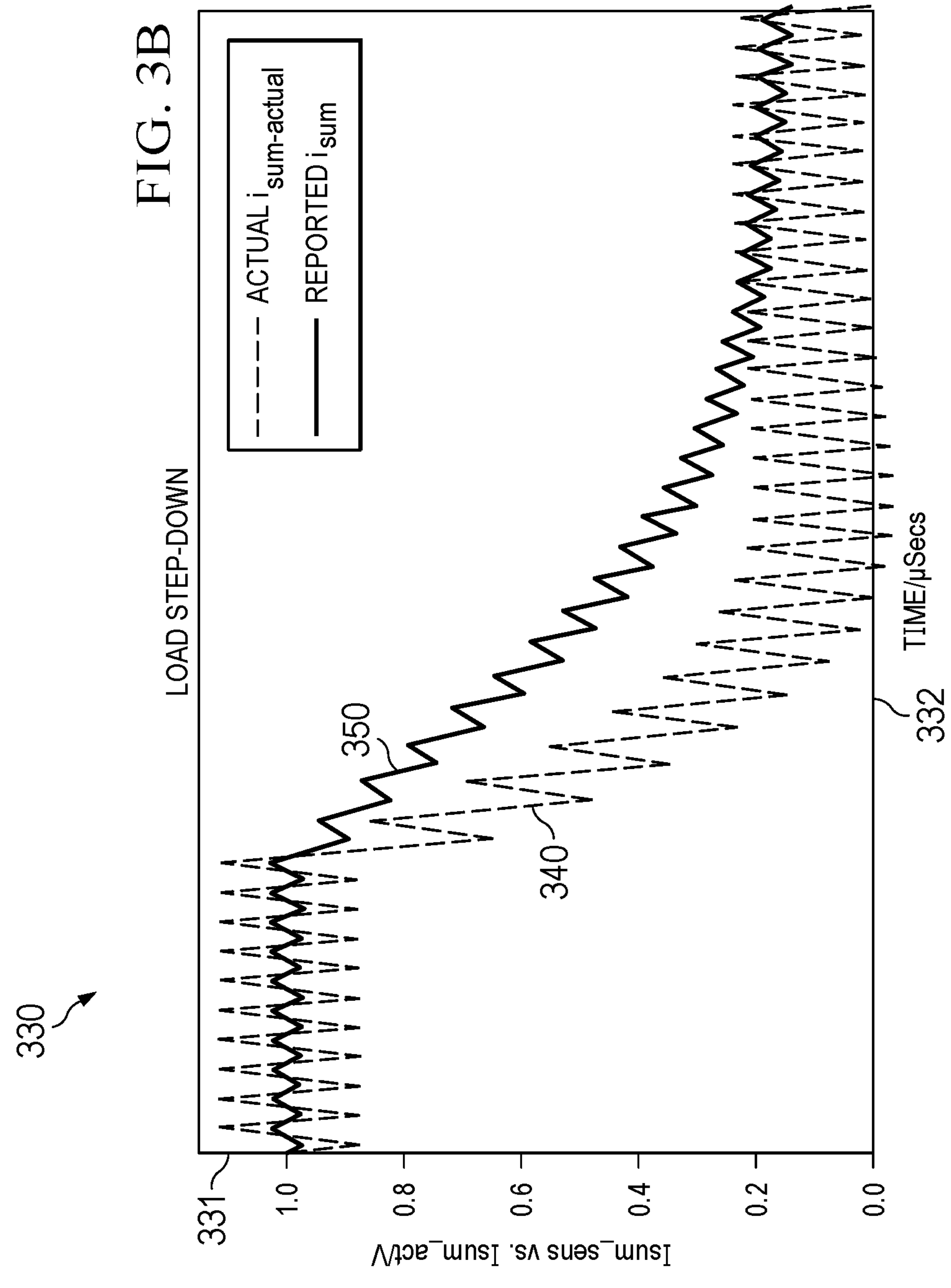

FIGS. 3A and 3B illustrate actual total current and reported total current for the buck converter of FIG. 1 during load step-up 300 and load step-down 330 respectively. FIGS. 3A and 3B are simulation results illustrating the difference between actual total current and reported total current from all phases of the buck converter of FIG. 1. The vertical axis is current reported as a signal in V 301 and 331 while the horizontal axis is time in uS 302 and 332.

FIG. 3A shows the difference between actual total current $i_{sum\text{-}actual}$ 310 and reported total current $i_{sum}$ 320 for a single stage of the buck converter of FIG. 1 during a load step-up.

FIG. 3B shows the difference between actual total current $i_{sum\text{-}actual}$ 340 and reported total current $i_{sum}$ 250 for a single stage of the buck converter of FIG. 1 during a load step-down.

In both cases the reported total current lags the actual total current resulting in errors in the control loop within the controller. The delay in $i_{sum}$ delays the response of the compensation loop in the controller, resulting in ringing in the output voltage.

Figure 4A:
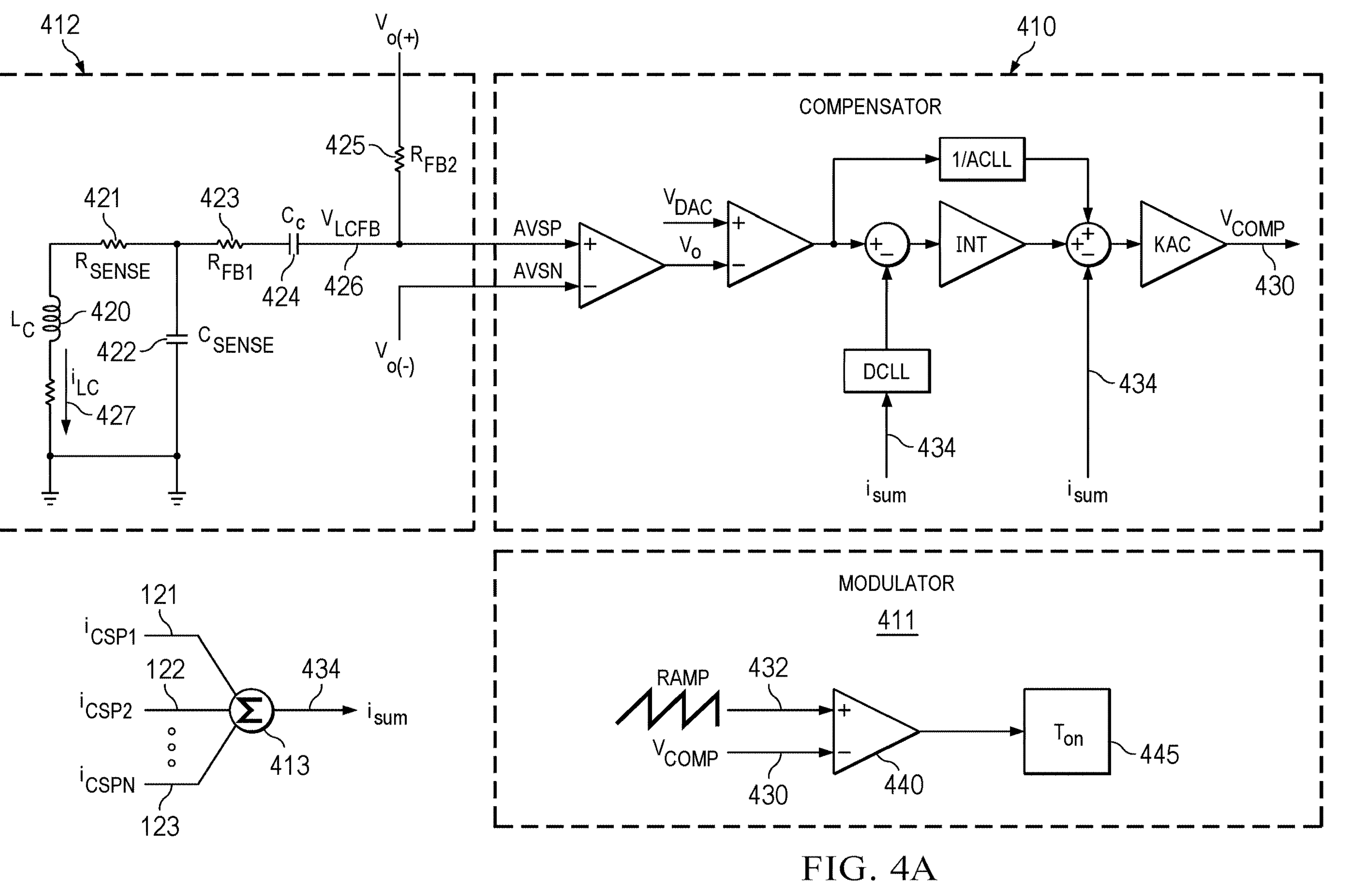
FIG. 4A illustrates an example embodiment of a compensation circuit for improving transient response of a buck converter.

FIG. 4A illustrates an example embodiment of a compensation circuit 412 for improving transient response of a buck converter. In this example, a controller includes a compensator circuit 410 and a modulator circuit 411. Compensation circuit 412 includes the compensation inductor $L_c$ 420, equivalent to compensation inductor $L_c$ 170 of FIG. 1. Compensation inductor $L_c$ 420 includes a compensation resistor and together they have a compensation time constant and a current of $i_{Lc}$ 427. Compensation circuit 412 also includes a current emulation circuit comprising sense resistor $R_{sense}$ 421, sense capacitor $C_{sense}$ 422, feedback resistors $R_{FB1}$ 423 and $R_{FB2}$ 425, and compensation capacitor $C_C$ 424.

Sense resistor $R_{sense}$ 421, sense capacitor $C_{sense}$ 422 have a current emulation time constant. Sense resistor $R_{sense}$ 421, sense capacitor $C_{sense}$ 422 are selected such that the current emulation time constant is less than the compensation inductor time constant. Because the current emulation time constant is less than the compensation inductor time constant, the current emulation circuit only modifies the reported power stage current signal for a short time (i.e., during load transients) and does not modify the reported power stage current signal during steady state.

Figure 11:
FIG. 11 illustrates an example embodiment of a compensation circuit for improving transient response of a buck converter including two feedback resistors.
Figure 12:
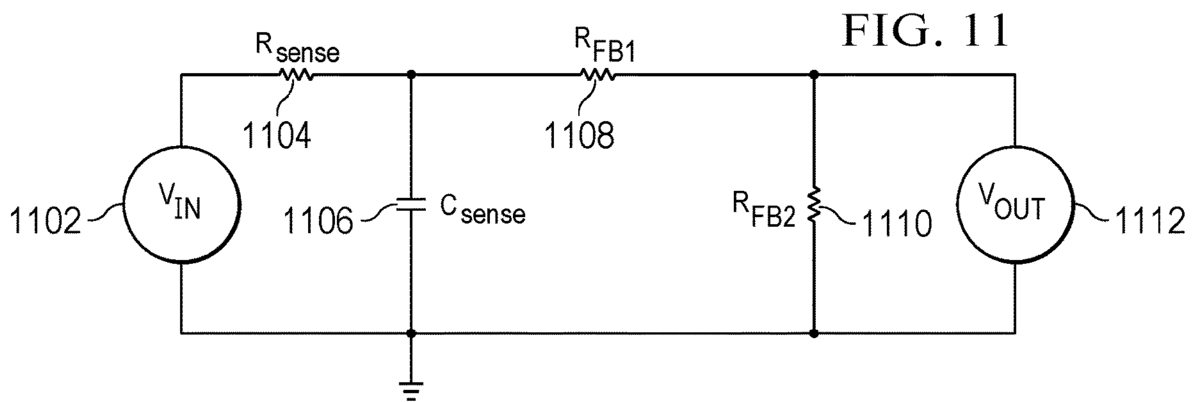
FIG. 12 illustrates gain of a compensation signal generated with different values of the feedback resistors, for example.
Figure 12:
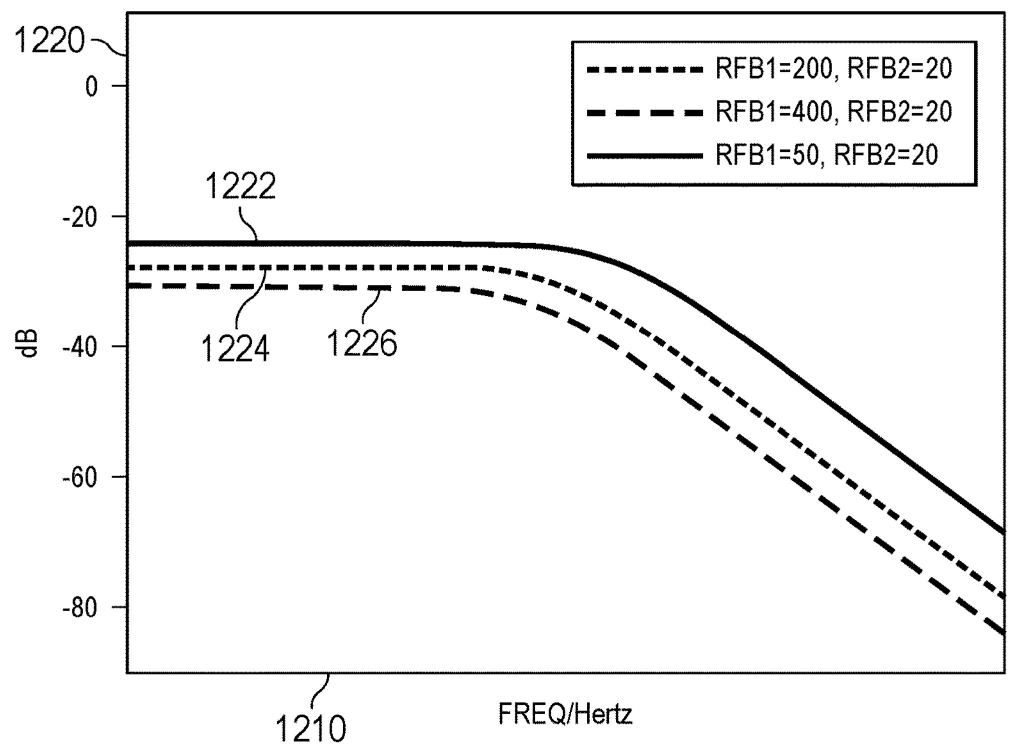

In this example, compensation circuit 412 includes feedback resistors $R_{FB1}$ 423 and $R_{FB2}$ 425 which are selected in order to control a gain of the current emulation of the compensation signal. This functionality of the feedback resistors is illustrated in FIGS. 11 and 12 and described below.

Figure 13:
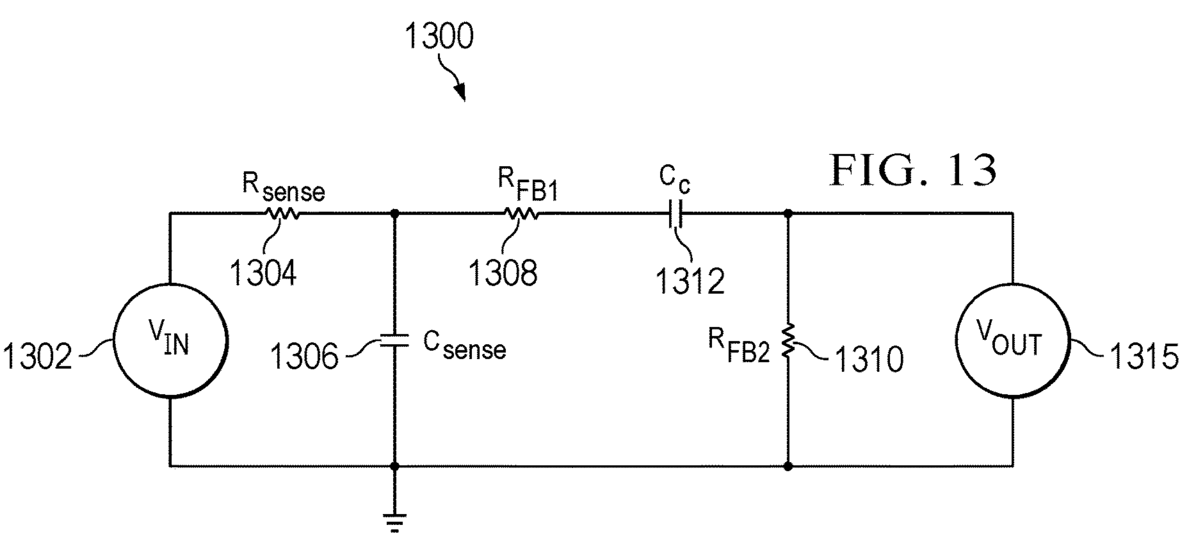
FIG. 13 illustrates an example embodiment of a compensation circuit for improving transient response of a buck converter including a compensation capacitor.
Figure 14:
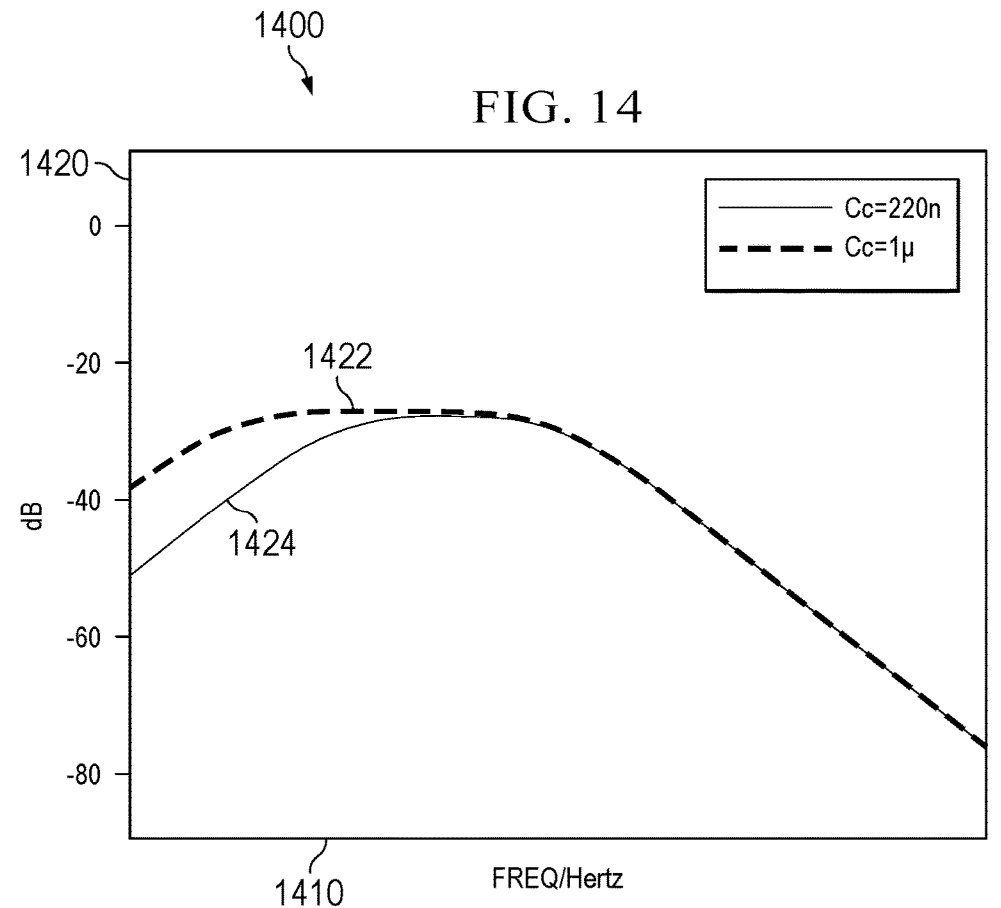
FIG. 14 illustrates gain of a compensation signal generated with different values of the compensation capacitor showing varying DC offsets, for example.

In this example, compensation circuit 412 also includes compensation capacitor $C_C$ 424 which is selected to remove a DC offset of the compensation signal. This functionality of the compensation capacitor is illustrated in FIGS. 13 and 14 and described below.

The output of compensation circuit 412 $V_{LCFB}$ 426 is provided to the compensator circuit 410 within the controller. Compensator circuit 410 produces the signal V comp 430 which is then provided to a modulator circuit 411 within the controller. V comp 430 is compared 440 to a RAMP signal 432 (which reduces noise and jitter in pulse width modulators) and the difference is used to control the on time 445 of the PWM signals which are used to control each phase of the buck converter.

This circuit also includes a current summing device 413 adding currents $i_{CSP1}$ 121, $i_{CSP2}$ 122 through $i_{CSPN}$ 123 to produce $i_{sum}$ 434 that is then provided to compensator circuit 410.

Figure 4B:
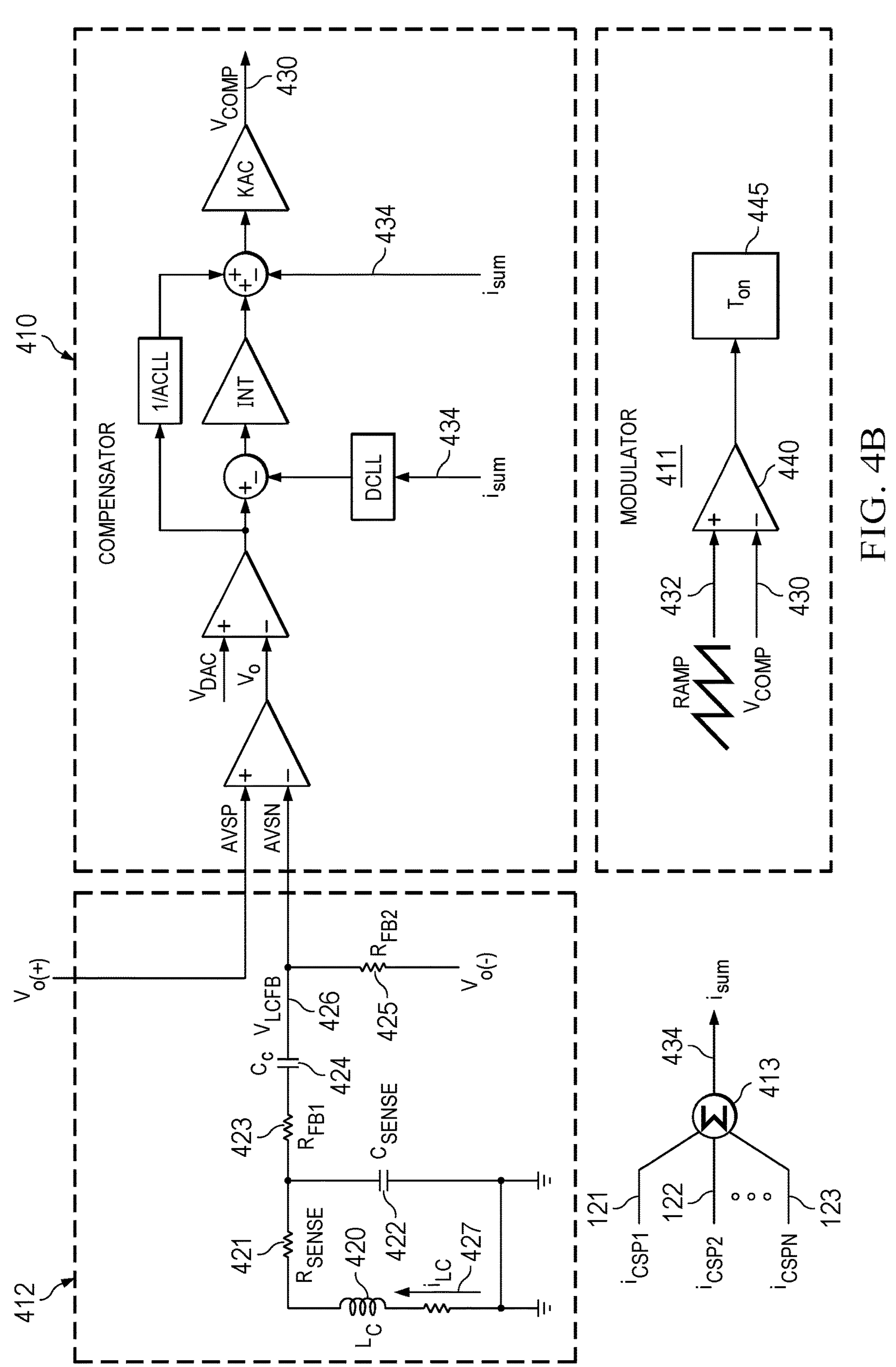
FIG. 4B illustrates another example embodiment of a compensation circuit for improving transient response of a buck converter.

FIG. 4B illustrates another example embodiment of a compensation circuit 412 for improving transient response of a buck converter. This embodiment of compensation circuit 412 is identical to that of FIG. 4A but connected to compensator 410 in an opposite polarity configuration. Note that current current $i_{LC}$ 427 flows in the opposite direction to current $i_{LC}$ 427 of FIG. 4A, and that feedback resistor $R_{FB2}$ 425 is now connected to the AVSN input of compensator 410.

Figure 5:
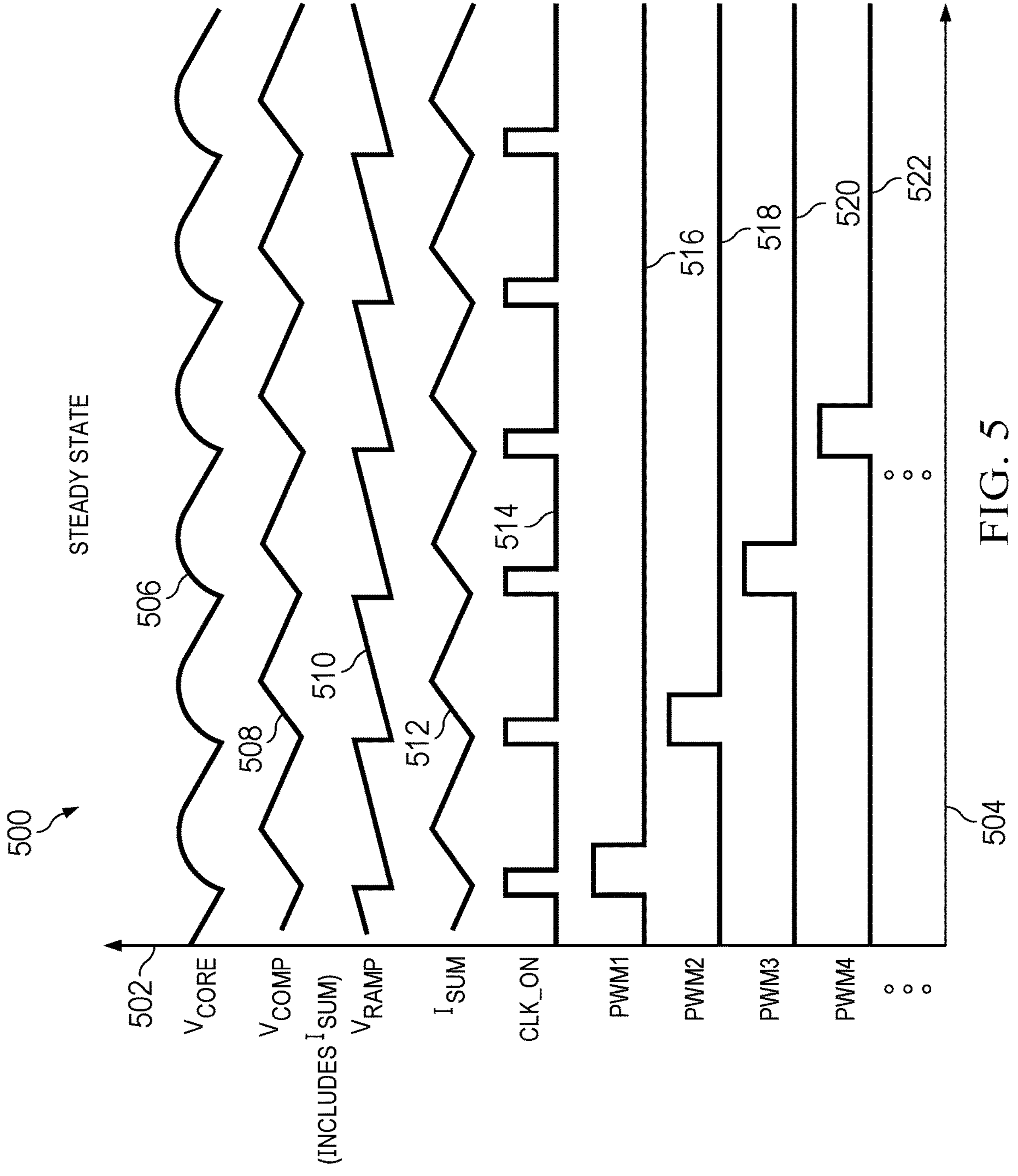
FIG. 5 illustrates various signals within the controller of FIG. 4 during steady state operation, for example.

FIG. 5 illustrates various signals within the controller of FIG. 4 during steady state operation 500. In this illustration, voltage is shown in the vertical axis 502 and time along the horizontal axis 504.

Here, $V_{CORE}$ 506 is the CPU core voltage across the final load, $V_{COMP}$ 508 is the output of the compensator circuit 410 of FIG. 4, VRAMP 510 is the RAMP signal 432 of FIG. 4, $I_{SUM}$ 512 is the sum of the currents through all of the phases of the buck converter, CLK_ON 514 is the clock for the plurality of pulse width modulators within the controller (one for each phase of the buck converter), and PWM1 516, PWM2 518, PWM3 520, and PWM4 522 are the pulse width modulator control signals provided to each phase of the buck converter.

During steady state operation, when the load on the buck converter is stable, $I_{SUM}$ and $V_{CORE}$ vary slightly with each phase of the buck converter and the compensation signal $V_{COMP}$ varies slightly with them. No major changes are made to the on time or duty cycle of the pulse width modulators.

Figure 6:
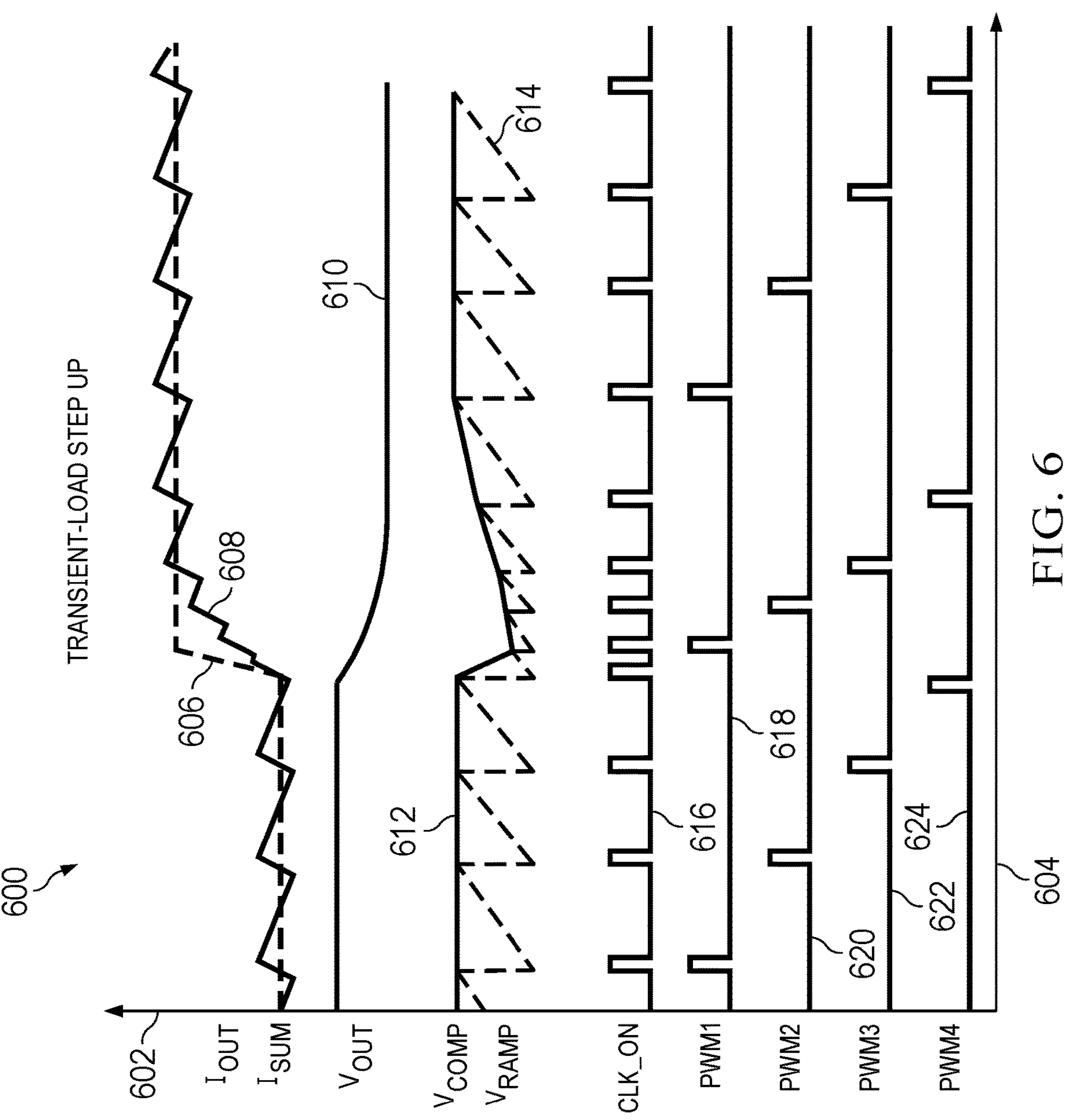
FIG. 6 illustrates various signals within the controller of FIG. 4 during a load step-up transient, for example.

FIG. 6 illustrates various signals within the controller of FIG. 4 during a load step-up transient 600. In this illustration, voltage is shown in the vertical axis 602 and time along the horizontal axis 604.

Here, $I_{OUT}$ 606 is the actual output current of the buck converter ($I_O$ 181 in FIG. 1), $I_{SUM}$ 608 is the sum of the outputs of the current sensors within each phase of the buck converter (note that this signal is not able to match the slew rate of the actual output current), $V_{OUT}$ 610 is the actual output voltage of the buck converter ($V_O$ 180 in FIG. 1), $V_{COMP}$ 612 is the output of the compensator circuit 410 of FIG. 4, VRAMP 614 is the RAMP signal 432 of FIG. 4, CLK_ON 616 is the clock for the plurality of pulse width modulators within the controller (one for each phase of the buck converter), and PWM1 618, PWM2 620, PWM3 622, and PWM4 624 are the pulse width modulator control signals provided to each phase of the buck converter.

When the load on the output of the buck converter suddenly increases, the output current $I_{OUT}$ 606 rapidly increases to meet the new load, and the output voltage $V_{OUT}$ 610 sags under the increased load. The measured total current $I_{SUM}$ 608 is unable to keep up with the slew rate of the actual output current $I_{OUT}$ 606, so in order to compensate for the delayed response of the current sensors the compensation circuit (412 in FIG. 4) modifies the compensation signal ($V_{LCFB}$ 426 in FIG. 4) which is provided to the compensator circuit 410, which in turn modifies the $V_{COMP}$ 612 signal. This results in changes to the duty cycle of the pulse width modulators during the transient, controlling the phases of the buck converter to accurately account for the change in load during the transient. Since the modified compensation signal corrects for the delay in the measured total current $I_{SUM}$ 608, the buck converter responds to this transient without ringing on the output voltage $V_{OUT}$ 610.

Figure 7:
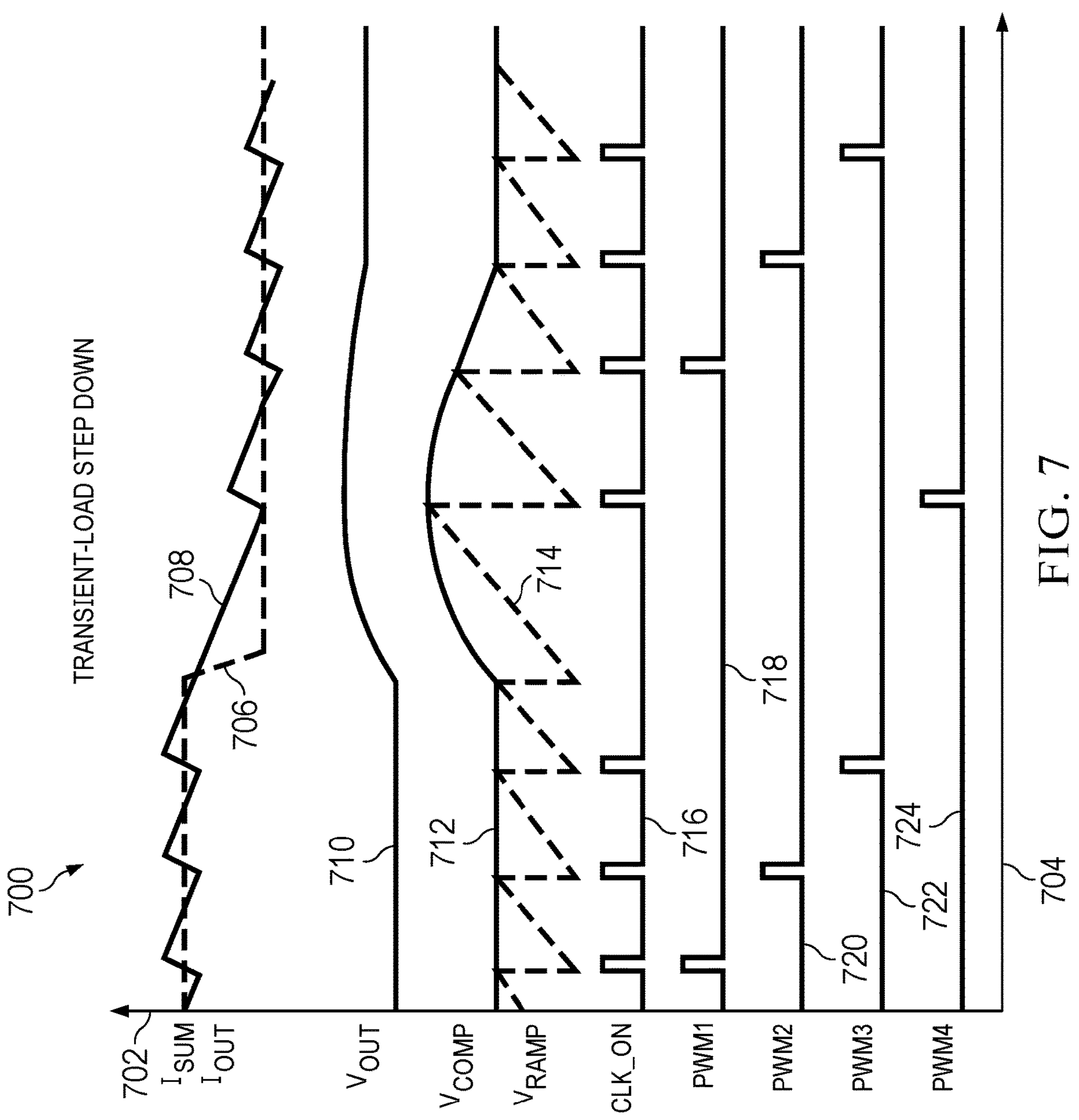
FIG. 7 illustrates various signals within the controller of FIG. 4 during a load step-down transient, for example.

FIG. 7 illustrates various signals within the controller of FIG. 4 during a load step-down transient 700. In this illustration, voltage is shown in the vertical axis 702 and time along the horizontal axis 704.

Here, $I_{OUT}$ 706 is the actual output current of the buck converter ($I_O$ 181 in FIG. 1), $I_{SUM}$ 708 is the sum of the outputs of the current sensors within each phase of the buck converter (note that this signal is not able to match the slew rate of the actual output current), VOLT 710 is the actual output voltage of the buck converter ($V_O$ 180 in FIG. 1), $V_{COMP}$ 712 is the output of the compensator circuit 410 of FIG. 4, VRAMP 714 is the RAMP signal 432 of FIG. 4. CLK_ON 716 is the clock for the plurality of pulse width modulators within the controller (one for each phase of the buck converter), and PWM1 718, PWM2 720, PWM3 722, and PWM4 724 are the pulse width modulator control signals provided to each phase of the buck converter.

When the load on the output of the buck converter suddenly decreases, the output current $I_{OUT}$ 706 rapidly decreases to meet the new load, and the output voltage $V_{OUT}$ 710 rises under the decreased load. The measured total current $I_{SUM}$ 708 is unable to keep up with the slew rate of the actual output current $I_{OUT}$ 706, so in order to compensate for the delayed response of the current sensors the compensation circuit (412 in FIG. 4) modifies the compensation signal ($V_{LCFB}$ 426 in FIG. 4) which is provided to the compensator circuit 410, which in turn modifies the $V_{COMP}$ 712 signal. This results in changes to the duty cycle of the pulse width modulators during the transient, controlling the phases of the buck converter to accurately account for the change in load during the transient. Since the modified compensation signal corrects for the delay in the measured total current $I_{SUM}$ 708, the buck converter responds to this transient without ringing on the output voltage VOLT 710.

Figure 8A:
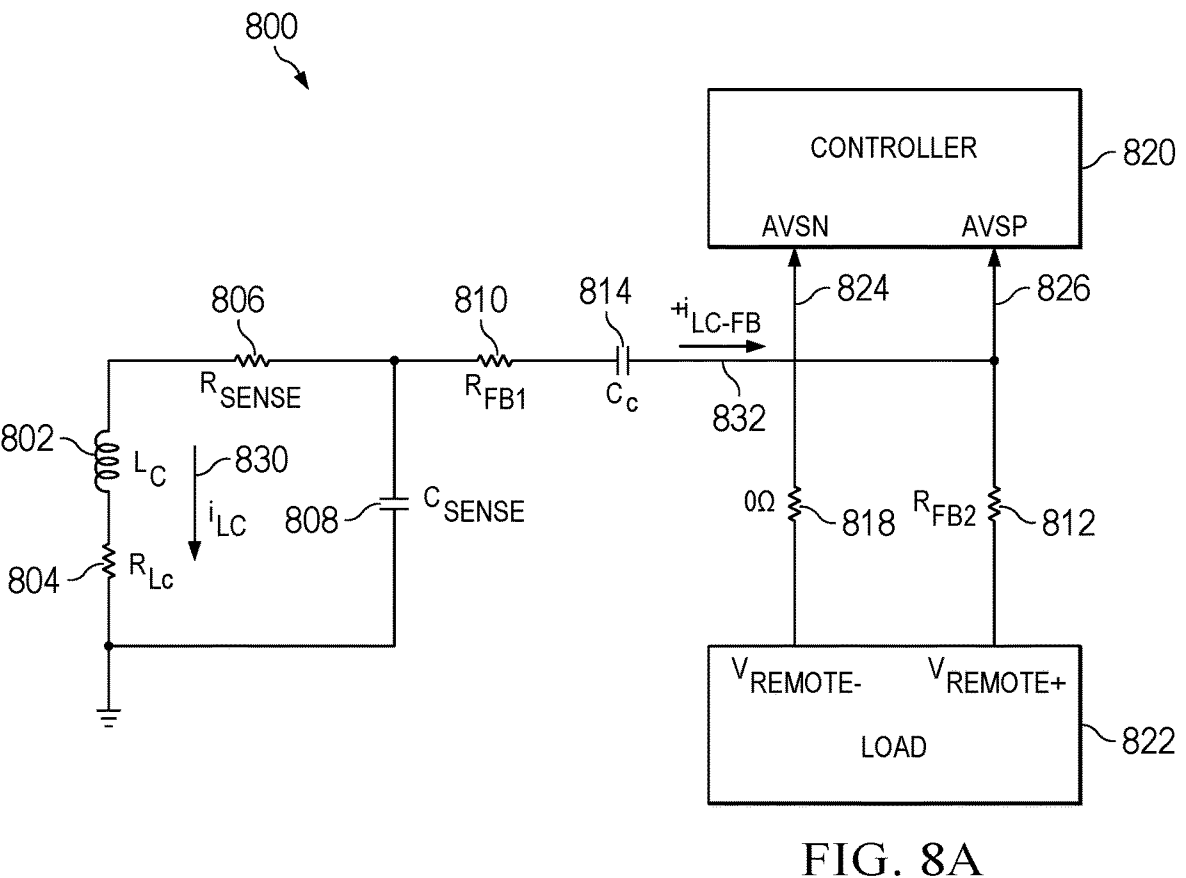
FIG. 8A illustrates an example embodiment of a compensation circuit for improving transient response of a buck converter.

FIG. 8A illustrates an example embodiment of a compensation circuit 800 for improving transient response of a buck converter. In this example, a controller 820 includes differential input terminals AVSN 824 and AVSP 826 coupled with Load 822. Terminal 824 is coupled directly to the load (illustrated as a 0 Ohm resistor 818) and terminal 826 is coupled to the load through feedback resistor $R_{FB2}$ 812. This compensation circuit 800 includes the compensation inductor $L_c$ 802, equivalent to compensation inductor $L_c$ 170 of FIG. 1, and compensation resistor $R_{LC}$ 804. Together compensation inductor $L_c$ 802 and compensation resistor $R_{LC}$ 804 have a compensation time constant and a current $i_{Lc}$ 830. The compensation circuit 800 also includes a current emulation circuit comprising sense resistor $R_{sense}$ 806, sense capacitor $C_{sense}$ 808, feedback resistors $R_{FB1}$ 810 and $R_{FB2}$ 812, and compensation capacitor $C_C$ 814.

Sense resistor $R_{sense}$ 806, sense capacitor $C_{sense}$ 808 have a current emulation time constant. Sense resistor $R_{sense}$ 806, sense capacitor $C_{sense}$ 808 are selected such that the current emulation time constant is less than the compensation inductor time constant. Since the current emulation time constant is less than the compensation inductor time constant, the current emulation circuit only has an effect on the reported power stage current signal for a short time (i.e., during load transients) and does not affect the reported power stage current signal during steady state.

In this example, compensation circuit 800 includes feedback resistors $R_{FB1}$ 810 and $R_{FB2}$ 812 which are selected in order to control a gain of the current emulation. This functionality of the feedback resistors is illustrated in FIGS. 11 and 12 and described below.

In this example, compensation circuit 800 also includes compensation capacitor $C_C$ 814 which is selected to remove a DC offset of the compensation signal. This functionality of the compensation capacitor is illustrated in FIGS. 13 and 14 and described below.

The output of compensation circuit 800 $I_{LC-FB}$ 806 is provided to the controller 820 at its AVSP input 826. $I_{LC-FB}$ 806 is a voltage corresponding to the current through compensation inductor $L_c$ 802 modified by the current emulation circuit comprising sense resistor $R_{sense}$ 806, sense capacitor $C_{sense}$ 808, feedback resistors $R_{FB1}$ 810 and $R_{FB2}$ 812, and compensation capacitor $C_C$ 814.

The current emulation circuit is added to the compensation inductor $L_c$ 802 and compensation resistor $R_{LC}$ 804 in the TLVR circuit, and is designed to have a shorter time constant than the compensation inductor $L_c$ 802 and compensation resistor $R_{LC}$ 804 in order to operate only during transient conditions and to avoid impacting steady state operation. The feedback resistors $R_{FB1}$ 810 and $R_{FB2}$ 812 are used to adjust the gain of this signal before adding it to the internal compensation loop. An AC decoupling capacitor, compensation capacitor $C_C$ 814, is also added to remove any DC offset between the sensed signal and the added feedback signal due to ground mismatch. The external feedback signal $I_{LC-FB}$ 806 is added to the compensation loop through the differential voltage sense pins to add this information inside the compensation loop and to optimize the transient response.

Figure 8B:
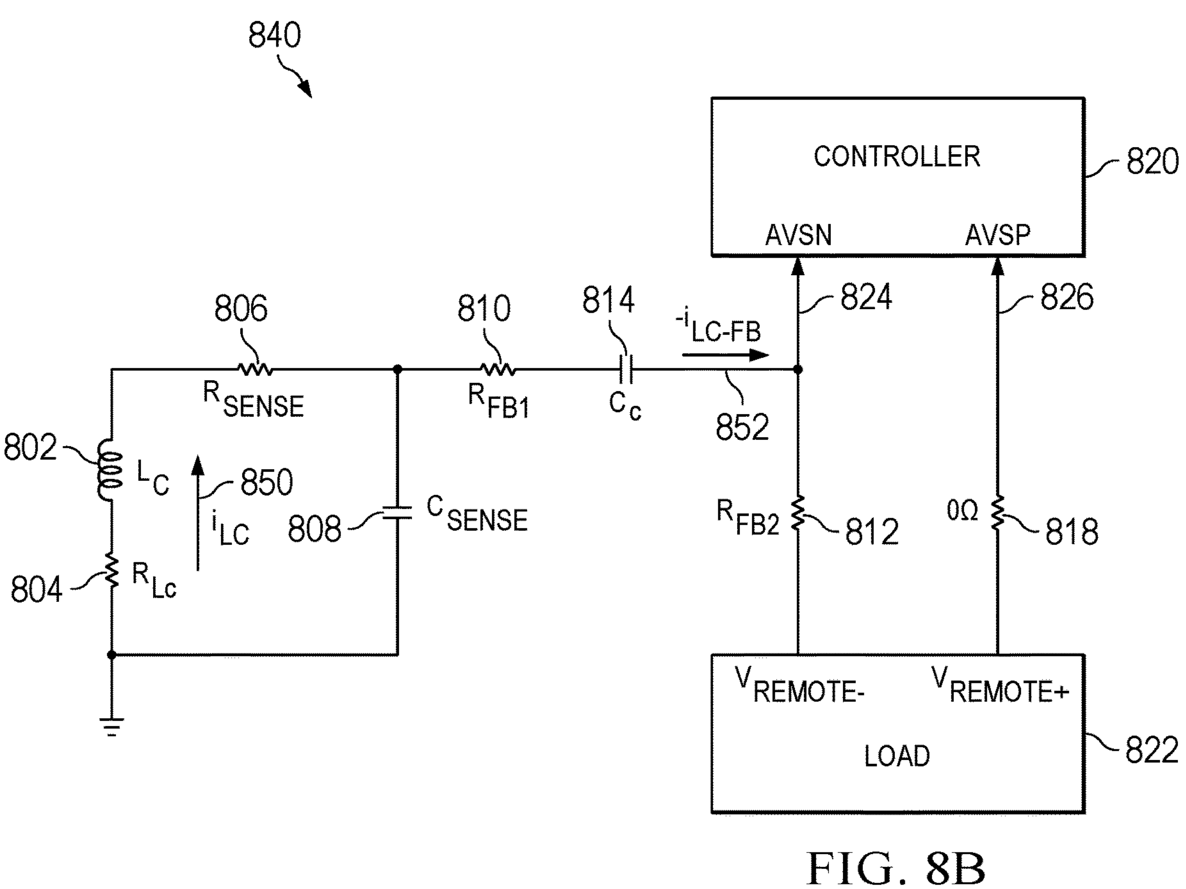
FIG. 8B illustrates another example embodiment of a compensation circuit for improving transient response of a buck converter.

FIG. 8B illustrates another example embodiment of a compensation circuit 840 for improving transient response of a buck converter. This embodiment of compensation circuit 840 is identical to compensation circuit 800 of FIG. 8A but connected to controller 820 in an opposite polarity configuration. Note that current $i_{LC}$ 850 flows in the opposite direction to current $i_{LC}$ 830 of FIG. 8A, and that feedback resistor $R_{FB2}$ 812 is now connected to the AVSN 824 input of controller 820, and the AVSP 826 input of controller 820 is now connected directly to load 822.

Figure 9A:
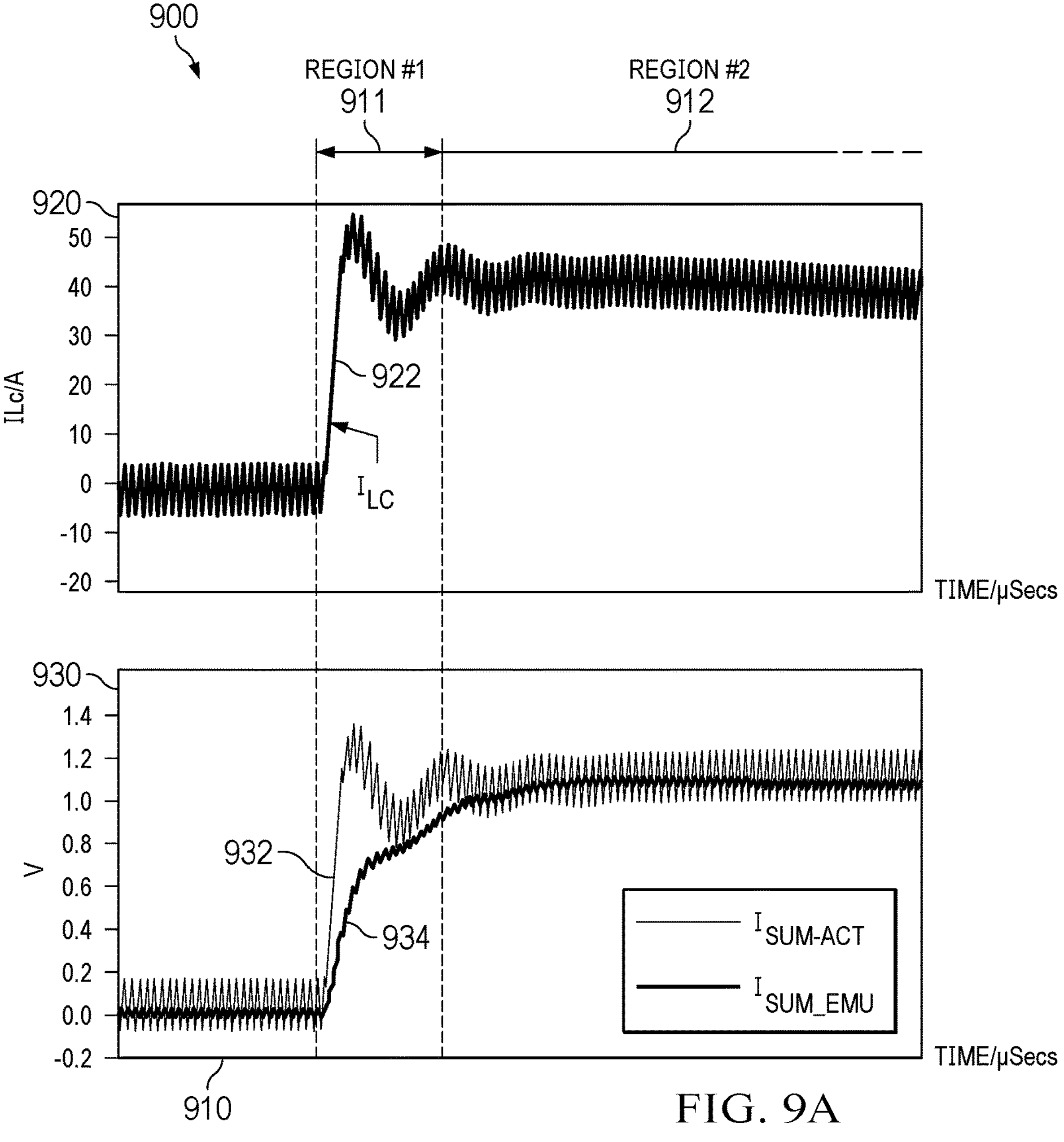
FIGS. 9A and 9B illustrate transient responses of total current during load step-up and load step-down, for example.
Figure 9B:
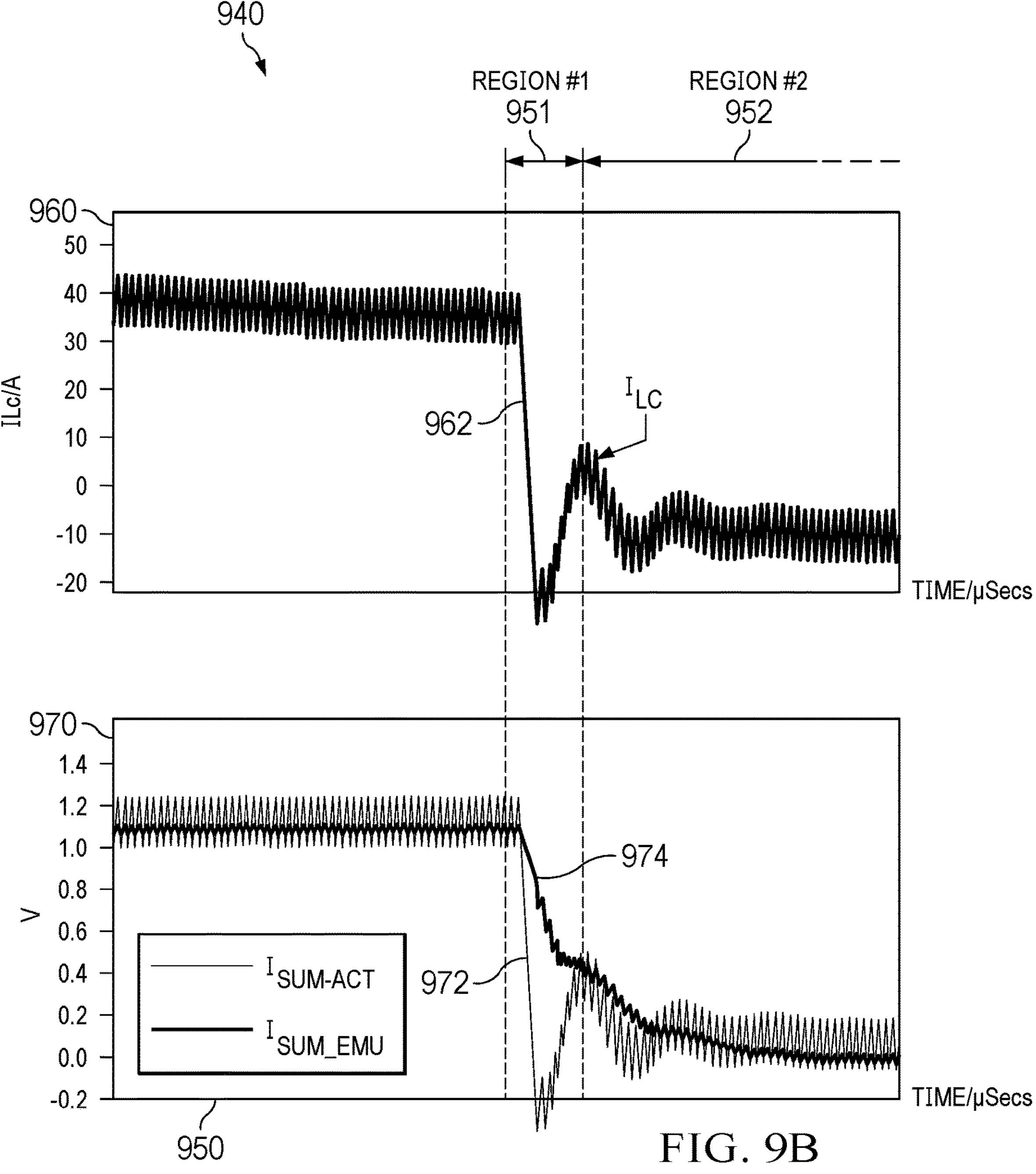

FIGS. 9A and 9B illustrate transient responses of total current during load step-up 900 and load step-down 940. FIG. 9A shows time in uS along the horizontal axis 910 and current $I_{LC}$ 922 through the compensation inductor ($L_C$ 170 in FIG. 1) in the vertical axis 920 of the upper simulation and voltage corresponding to total current in the vertical axis 930 of the lower simulation.

In this example, during a sudden increase in load on the buck converter, the current through the compensation inductor $I_{LC}$ 922 rapidly rises to a new steady state after some ringing. The actual total current $I_{SUM-ACT}$ 932 reflects the total current through the compensation inductor $I_{LC}$ 922 while the measured total current $I_{SUM}$ EMC 934 lags the actual current during the transient (Region #1 911) and is accurate during steady state (Region #2 912). Thus, the current emulation circuit only needs to operate during Region #1 911, and not during Region #2 912. This is why the current emulation circuit is designed to have a shorter time constant than the compensation inductor $L_c$ 802 and compensation resistor $R_{LC}$ 804, such that it only modifies the compensation circuit during Region #1 911.

FIG. 9B shows time in μS along the horizontal axis 950 and current $I_{LC}$ 962 through the compensation inductor ($L_C$ 170 in FIG. 1) in the vertical axis 960 of the upper simulation and voltage corresponding to total current in the vertical axis 970 of the lower simulation.

In this example, during a sudden decrease in load on the buck converter, the current through the compensation inductor $I_{LC}$ 962 rapidly drops to a new steady state after some ringing. The actual total current $I_{SUM-ACT}$ 972 reflects the total current through the compensation inductor $I_{LC}$ 962 while the measured total current $I_{SUM}$ EMU 974 lags the actual current during the transient (Region #1 951) and is accurate during steady state (Region #2 952). Thus, the current emulation circuit only needs to operate during Region #1 951, and not during Region #2 952. This is why the current emulation circuit is designed to have a shorter time constant than the compensation inductor $L_c$ 802 and compensation resistor $R_{LC}$ 804, such that it only modifies the compensation circuit during Region #1 951.

Figure 10A:
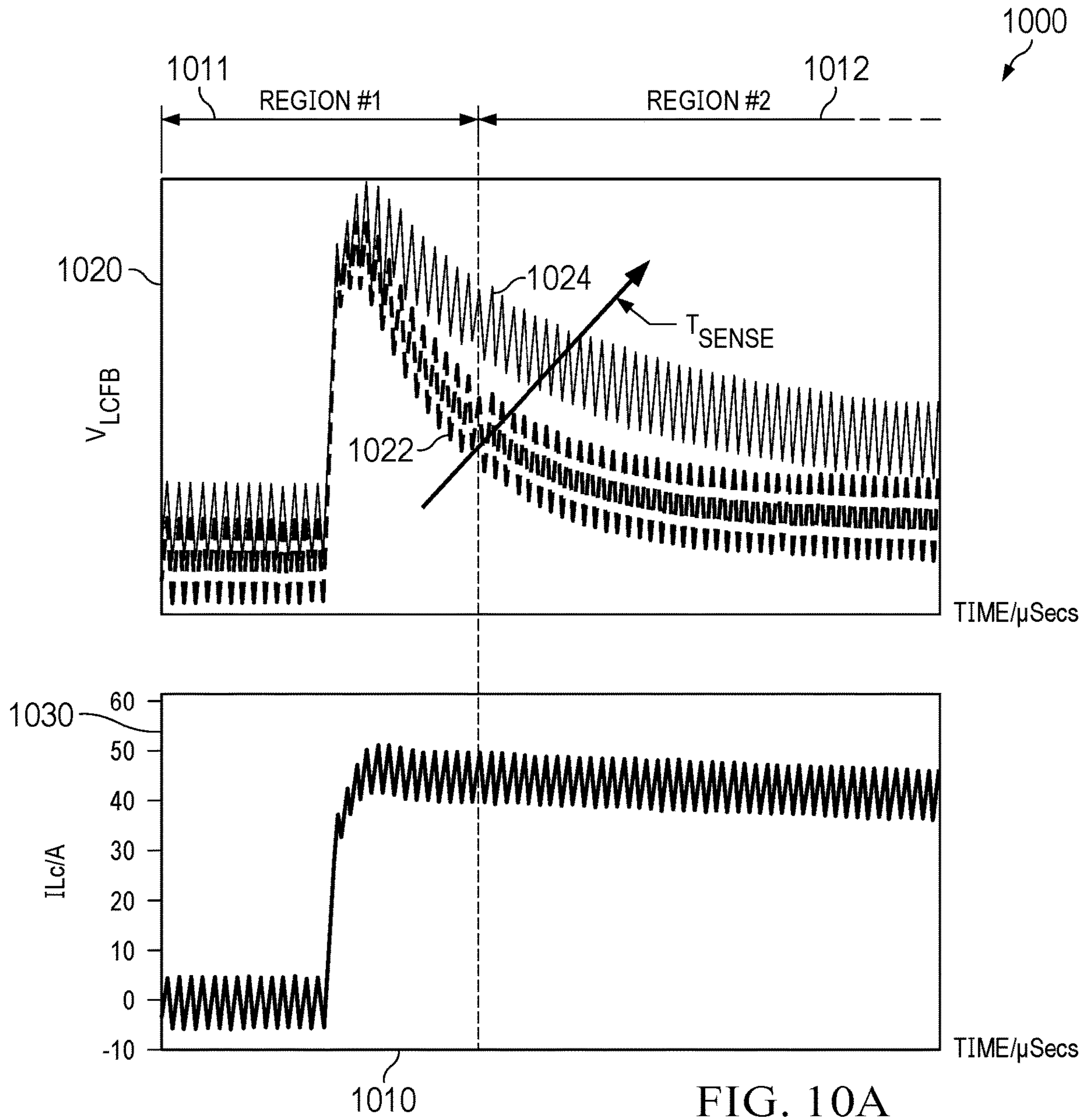
FIGS. 10A and 10B illustrate transient responses of voltage across and current through a compensation inductor during load step-up and load step-down with varying time constants of a current emulation circuit, for example.
Figure 10B:
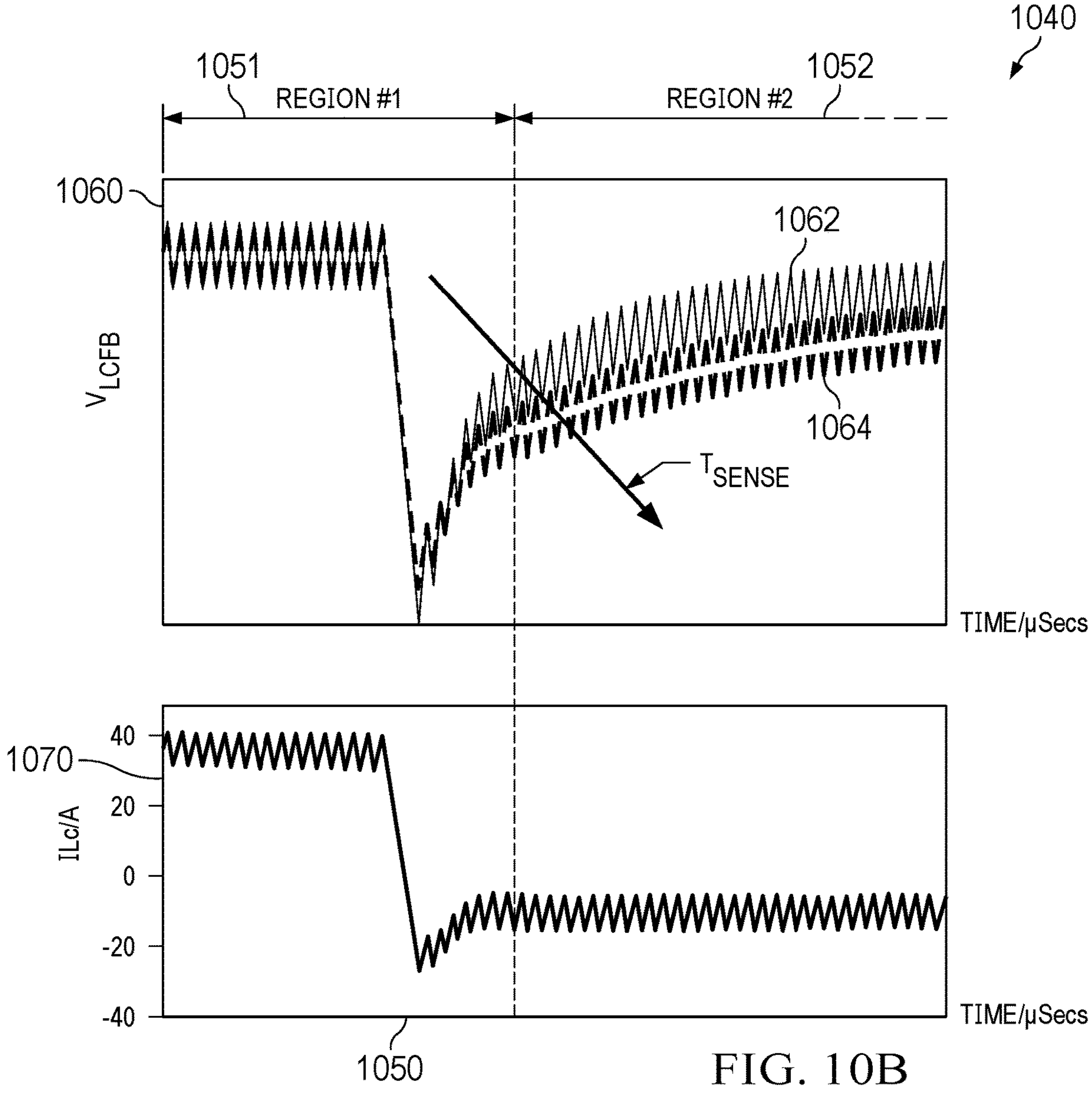

FIGS. 10A and 10B illustrate transient responses of voltage across and current through a compensation inductor during load step-up 1000 and load step-down 1040 with varying time constants of a current emulation circuit.

FIG. 10A shows time in uS along the horizontal axis 1010 and current $I_{LC}$ 1030 through the compensation inductor ($L_c$ 170 in FIG. 1) in the lower simulation and the modified compensation signal $V_{LCFB}$ 1020 for varying values of sense resistor $R_{sense}$ 421, sense capacitor $C_{sense}$ 422 in the upper simulation.

In this example, two different waveforms 1022 and 1024 of modified compensation signal $V_{LCFB}$ 1020 are illustrated. Waveform 1022 illustrates an embodiment where sense resistor $R_{sense}$ 421, sense capacitor $C_{sense}$ 422 have a smaller time constant, while waveform 1024 illustrates an embodiment where sense resistor $R_{sense}$ 421, sense capacitor $C_{sense}$ 422 have a larger time constant. When the current emulation time constant is smaller (waveform 1022), the current emulation circuit operates during Region #1 1011 and approaches steady state during Region #2 1012. When the current emulation time constant is large (waveform 1024), the current emulation circuit is operating both during Region #1 1011 and significantly into Region #2 1012.

FIG. 10B shows time in uS along the horizontal axis 1050 and current $I_{LC}$ 1070 through the compensation inductor ($L_c$ 170 in FIG. 1) in the lower simulation and the modified compensation signal $V_{LCFB}$ 1060 for varying values of sense resistor $R_{sense}$ 421, sense capacitor $C_{sense}$ 422 in the upper simulation.

In this example, two different waveforms 1062 and 1064 of modified compensation signal $V_{LCFB}$ 1060 are illustrated. Waveform 1062 illustrates an embodiment where sense resistor $R_{sense}$ 421, sense capacitor $C_{sense}$ 422 have a smaller time constant, while waveform 1064 illustrates an embodiment where sense resistor $R_{sense}$ 421, sense capacitor $C_{sense}$ 422 have a larger time constant. When the current emulation time constant is smaller (waveform 1062), the current emulation circuit operates during Region #1 1011 and approaches steady state during Region #2 1012. When the current emulation time constant is large (waveform 1064), the current emulation circuit is operating both during Region #1 1011 and significantly into Region #2 1012.

FIG. 11 illustrates an example embodiment of a compensation circuit 1100 for improving transient response of a buck converter including two feedback resistors 1108 and 1110. In this example, compensation circuit 1100 includes $V_{IN}$ 1102 (the voltage across compensation inductor $L_c$ 802 and compensation resistor $R_{LC}$ 804 in FIG. 8), sense resistor $R_{sense}$ 1104, sense capacitor $C_{sense}$ 1106, and feedback resistors $R_{FB1}$ 1108 and $R_{FB2}$ 1110. The modified compensation signal is illustrated as $V_{out}$ 1112.

FIG. 12 illustrates gain of a compensation signal 1112 generated with different values of the feedback resistors 1108 and 1110. In this example simulation of compensation circuit 1100, gain 1220 is illustrated on the vertical axis while time 1210 is illustrated on the horizontal axis. Waveforms 1222, 1224, and 1226 are shown for three different sets of feedback resistors 1108 and 1110.

Waveform 1222 corresponds to feedback resistor values of 50 Ohms for $R_{FB1}$ 1108 and 20 Ohms for $R_{FB2}$ 1110. Waveform 1224 corresponds to feedback resistor values of 200 Ohms for $R_{FB1}$ 1108 and 20 Ohms for $R_{FB2}$ 1110. Waveform 1226 corresponds to feedback resistor values of 400 Ohms for $R_{FB1}$ 1108 and 20 Ohms for $R_{FB2}$ 1110.

Waveform 1222 has the largest gain, while waveform 1226 has the smallest gain. By selecting the values of feedback resistors $R_{FB1}$ 1108 and $R_{FB2}$ 1110 the gain of the compensation signal is controlled.

FIG. 13 illustrates an example embodiment of a compensation circuit 1300 for improving transient response of a buck converter including a compensation capacitor 1312. In this example, compensation circuit 1300 includes $V_{IN}$ 1302 (the voltage across compensation inductor $L_c$ 802 and compensation resistor $R_{LC}$ 804 in FIG. 8), sense resistor $R_{sense}$ 1304, sense capacitor $C_{sense}$ 1306, feedback resistors $R_{FB1}$ 1308 and $R_{FB2}$ 1310, and compensation capacitor $C_C$ 1312. The modified compensation signal is illustrated as $V_{out}$ 1315.

FIG. 14 illustrates gain of a compensation signal 1315 generated with different values of the compensation capacitor $C_C$ 1312 showing varying DC offsets. In this example simulation of compensation circuit 1300, gain 1420 is illustrated on the vertical axis while time 1410 is illustrated on the horizontal axis. Waveforms 1422, and 1424 are shown for two different compensation capacitor $C_C$ 1312.

Waveform 1422 corresponds to a compensation capacitor value of 1 uF. Waveform 1424 corresponds to a compensation capacitor value of 220 nF. Waveform 1422 has the largest DC offset, while waveform 1424 has the smallest DC offset. By selecting the value of compensation capacitor $C_C$ 1312 the DC offset of the compensation signal is controlled.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A circuit comprising:

a resistor having a first terminal coupled to an inductor terminal, and a second terminal coupled to a capacitor terminal;

a current summing circuit having a first input coupled to a first current sense terminal, a second input coupled to a second current sense terminal, and an output; and a controller including:

a compensator circuit having a first input, a second input, and an output, the first input coupled to the second terminal of the resistor, and the second input coupled to the output of the current summing circuit; and a modulator circuit having an input coupled to the output of the compensator circuit.

2. The circuit of claim 1, further comprising:

a first capacitor coupled to the capacitor terminal; and a second capacitor having a first terminal coupled to the second terminal of the resistor and to the first terminal of the first capacitor and a second terminal coupled to the first input of the compensator circuit.

3. The circuit of claim 2, wherein the resistor is a first resistor, and further comprising:

a second resistor having a terminal coupled to the first input of the compensator circuit; and a third resistor having a first terminal coupled to the second terminal of the first resistor and to the first terminal of the first capacitor, and a second terminal coupled to the first terminal of the second capacitor.

4. The circuit of claim 1, further comprising an inductor coupled between the inductor terminal wherein the inductor has an associated resistance, in which a time constant of the inductor and the associated resistance is greater than a time constant of the first resistor and the first capacitor.

5. The circuit of claim 4, wherein the time constant of the first resistor and the first capacitor enables compensation for a combined sensed current signal at the output of the current summing circuit.

6. The circuit of claim 5, wherein the time constant of the first resistor and the first capacitor enables the compensation during transients of the combined sensed current signal.

7. The circuit of claim 5, wherein the compensation is responsive to a delay in the combined sensed current signal.

8. The circuit of claim 5, wherein the time constant of the first resistor and the first capacitor enables adjustment of an on time of a control signal at an output of the modulator circuit.

9. A circuit comprising:

transformer circuitry including:

a first transformer including a first primary winding and a first secondary winding, the first secondary winding having first and second terminals; and a second transformer including a second primary winding and a second secondary winding, the second secondary winding having a first terminal coupled to the second terminal of the first secondary winding and a second terminal coupled to a ground terminal;

an inductor having a first terminal coupled to the ground terminal and a second terminal coupled to the first terminal of the first secondary winding;

a first resistor having a first terminal coupled to the second terminal of the inductor, and a second terminal;

a capacitor having a first terminal coupled to the second terminal of the first resistor and a second terminal coupled to the ground terminal;

a second resistor having a terminal; and a third resistor having a first terminal coupled to the second terminal of the first resistor and to the first terminal of the capacitor, and a second terminal coupled to the terminal of the second resistor.

10. The circuit of claim 9, wherein the capacitor is a first capacitor, and further comprising a second capacitor having a first terminal coupled to the second terminal of the third resistor and a second terminal coupled to the terminal of the second resistor.

11. The circuit of claim 10, wherein the inductor is a first inductor, and further comprising:

a second inductor coupled in parallel with the first primary winding, the second inductor having a terminal coupled to an output terminal, wherein a second terminal of the second resistor is coupled to the output terminal; and a third inductor coupled in parallel with the second primary winding, the third inductor having a terminal coupled to the output terminal.

12. The circuit of claim 10, further comprising a controller having a feedback input coupled to the second terminal of the second capacitor and to the terminal of the second resistor, and having first and second current sense terminals, the controller including a current summing circuit having a first input coupled to the first current sense terminal and a second input coupled to the second current sense terminal.

13. The circuit of claim 12, wherein the inductor has an associated resistance, in which a time constant of the inductor and the associated resistance is greater than a time constant of the first resistor and the first capacitor.

14. The circuit of claim 13, wherein the time constant of the first resistor and the first capacitor is configured such that a signal at the feedback input includes compensation for a combined sensed current signal at an output of the current summing circuit.

15. The circuit of claim 14, wherein the time constant of the first resistor and the first capacitor is configured such that the compensation is provided during transients of the combined sensed current signal.

16. The circuit of claim 14, wherein the compensation is responsive to a delay in the combined sensed current signal.

17. The circuit of claim 14, wherein the time constant of the first resistor and the first capacitor enables adjustment of an on time of a pulse-width modulated control signal at an output of the controller.

18. A system comprising:

a converter circuit including:

a first power stage having a first control input and a first output; and a second power stage having a second control input and a second output;

an inductor having a first terminal coupled to a ground terminal, and a second terminal;

a resistor having a first terminal coupled to the second terminal of the inductor, and a second terminal;

a capacitor having a first terminal coupled to the second terminal of the resistor and a second terminal coupled to the ground terminal;

a controller having a feedback input coupled to the second terminal of the resistor and to the first terminal of the capacitor, a first current sense terminal coupled to the first output of the first power stage, and a second current sense terminal coupled to the second output of the second power stage, the controller including:

a current summing circuit having a first input coupled to the first current sense terminal and a second input coupled to the second current sense terminal;

a compensator having inputs coupled to an output of the current summing circuit and the feedback input; and a modulator having an input coupled to an output of the compensator, and outputs coupled to the first and second control inputs of the first and second power stages.

19. The system of claim 18, wherein the capacitor is a first capacitor, and further comprising a second capacitor having a first terminal coupled to the second terminal of the resistor and to the first terminal of the first capacitor and a second terminal coupled to the feedback input of the controller.

20. The system of claim 18, wherein the resistor is a first resistor, and further comprising:

a second resistor having a terminal coupled to the feedback input of controller; and a third resistor having a first terminal coupled to the second terminal of the first resistor and to the first terminal of the first capacitor, and a second terminal coupled to the first terminal of the second capacitor.

21. The system of claim 20, wherein the inductor has an associated resistance, in which a time constant of the inductor and the associated resistance is greater than a time constant of the first resistor and the first capacitor.

22. The system of claim 21, wherein the time constant of the first resistor and the first capacitor enables compensation for a combined sensed current signal at an output of the current summing circuit.

23. The system of claim 22, wherein the time constant of the first resistor and the first capacitor enables the compensation during transients of the combined sensed current signal.

24. The system of claim 22, wherein the compensation is responsive to a delay in the combined sensed current signal.

25. The system of claim 22, wherein the time constant of the first resistor and the first capacitor enables adjustment of an on time of a pulse-width modulated control signal at an output of the controller.

26. The system of claim 18, wherein the inductor is a first inductor, and further comprising:

transformer circuitry including:

a first transformer including a first primary winding having first and second terminals and a first secondary winding having first and second terminals, the first terminal of the first primary winding coupled to an output terminal that is coupled to a second terminal of the second resistor, the second terminal of the first primary winding coupled to a switching terminal of the first power stage, the first terminal of the first secondary winding coupled to the second terminal of the inductor; and a second transformer including a second primary winding having first and second terminals and a second secondary winding having first and second terminals, the first terminal of the second primary winding coupled to the output terminal, the second terminal of the second primary winding coupled to a switching terminal of the second power stage, the first terminal of the second secondary winding coupled to the second terminal of the first secondary winding, and the second terminal of the second secondary winding coupled to a ground terminal;

a second inductor coupled in parallel with the first primary winding, the second inductor having a terminal coupled to the output terminal; and a third inductor coupled in parallel with the second primary winding, the third inductor having a terminal coupled to the output terminal.

* * * * *